(12) United States Patent
Kibe et al.

(10) Patent No.: US 10,748,676 B2
(45) Date of Patent: Aug. 18, 2020

(54) LAN CABLE

(71) Applicant: Hitachi Metals, Ltd., Tokyo (JP)

(72) Inventors: Tamotsu Kibe, Tokyo (JP); Makoto Iwasaki, Tokyo (JP); Motoharu Kajiyama, Tokyo (JP); Mamoru Ohashi, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/904,947

(22) Filed: Feb. 26, 2018

(65) Prior Publication Data

US 2018/0247738 A1  Aug. 30, 2018

(30) Foreign Application Priority Data

Feb. 24, 2017  (JP) ................................. 2017-033546
May 2, 2017   (JP) ................................. 2017-091501

(51) Int. Cl.
| | |
|---|---|
| *H01B 7/00* | (2006.01) |
| *H01B 11/06* | (2006.01) |
| *C08L 23/08* | (2006.01) |
| *C08J 9/06* | (2006.01) |
| *H01B 3/44* | (2006.01) |

(Continued)

(52) U.S. Cl.
CPC .............. *H01B 11/06* (2013.01); *C08J 9/06* (2013.01); *C08L 23/0853* (2013.01); *H01B 3/44* (2013.01); *H01B 3/441* (2013.01); *H01B 7/0225* (2013.01); *H01B 7/17* (2013.01); *H01B 7/18* (2013.01); *H01B 7/295* (2013.01); *H01B 11/005* (2013.01);

(Continued)

(58) Field of Classification Search
CPC ........ H01B 7/18; H01B 7/295; H01B 7/0225; H01B 7/34; H01B 11/005
USPC ... 174/110 R, 113 R, 120 R, 120 SR, 121 R, 174/121 SR, 121 AR
See application file for complete search history.

(56) References Cited

U.S. PATENT DOCUMENTS

| | | | |
|---|---|---|---|
| 5,358,786 A | 10/1994 | Ishikawa et al. | |
| 5,597,981 A * | 1/1997 | Hinoshita | .............. H01B 7/295 174/110 PM |

(Continued)

FOREIGN PATENT DOCUMENTS

| | | |
|---|---|---|
| CN | 104200918 A1 | 12/2014 |
| EP | 0 380 244 A * | 1/1990 ............... H01B 7/34 |

(Continued)

OTHER PUBLICATIONS

Extended European Search Report issued in Application No. 18158669.4 by the European Patent Office, dated Jun. 21, 2018 (7 pages).

(Continued)

*Primary Examiner* — William H. Mayo, III
(74) *Attorney, Agent, or Firm* — Meunier Carlin & Curfman LLC (57) ABSTRACT

A LAN cable includes an insulated electrical wire having an insulating layer on an outer periphery of a conductor, a sheath that coats an outer periphery of the insulated electrical wire, and an intermediate layer arranged between the sheath and the insulated electrical wire, the intermediate layer having a mass reduction rate at 800° C. of less than or equal to 80% by mass. The sheath includes a cross-linked matter or a non-halogen flame retardant resin composition in which a mass reduction rate at 800° C. is less than or equal to 60% by mass.

5 Claims, 1 Drawing Sheet (51) Int. Cl.
  *H01B 7/295* (2006.01)
  *H01B 7/02* (2006.01)
  *H01B 7/18* (2006.01)
  *H01B 11/00* (2006.01)
  *H01B 7/17* (2006.01)
  *C08K 3/22* (2006.01)
(52) U.S. Cl.
  CPC ... *C08J 2323/06* (2013.01); *C08K 2003/2224* (2013.01)

(56) References Cited

U.S. PATENT DOCUMENTS

| | | | |
|---|---|---|---|
| 5,670,748 | A | 9/1997 | Gingue et al. |
| 5,689,090 | A * | 11/1997 | Bleich .................... H01B 7/295 |
| | | | 174/113 R |
| 6,255,594 | B1 | 7/2001 | Hudson |
| 2003/0070831 | A1 | 4/2003 | Hudson |
| 2003/0150638 | A1* | 8/2003 | Patel .................... H01B 11/005 |
| | | | 174/113 R |
| 2011/0079427 | A1 | 4/2011 | Powale et al. |
| 2012/0224818 | A1 | 9/2012 | Karayianni |
| 2012/0318557 | A1 | 12/2012 | Iwasaki et al. |
| 2014/0030520 | A1 | 1/2014 | Nakamura et al. |
| 2014/0141240 | A1* | 5/2014 | Segawa .................... H01B 3/30 |
| | | | 428/375 |
| 2016/0185944 | A1 | 6/2016 | Oriani |

FOREIGN PATENT DOCUMENTS

| | | |
|---|---|---|
| EP | 0410621 A1 | 1/1990 |
| EP | 0362929 A1 | 4/1990 |
| EP | 0380244 A1 | 8/1990 |
| JP | 2015004025 A | 1/2015 |
| JP | 2015038869 | 2/2015 |
| WO | 9625748 A1 | 8/1996 |

OTHER PUBLICATIONS

Non-Final Office Action relating to U.S. Appl. No. 15/904,938, dated Sep. 28, 2018.
Final Office Action relating to U.S. Appl. No. 15/904,938, dated May 1, 2019.
Advisory Action relating to U.S. Appl. No. 15/904,938, dated Jul. 19, 2019.
Extended European Search Report relating to European Application No. 18158668.6, dated Jun. 26, 2018.
Database WPI, Clarivate Analytics, 2017.
Office Action relating to European Application No. 18158668.6, dated May 6, 2020. 6 pages.
Office Action relating to European Application No. 18158669.4, dated Jul. 3, 2020. 7 pages.

* cited by examiner

LAN CABLE

CROSS-REFERENCE TO RELATED APPLICATIONS

This application claims the benefit of Japanese Patent Applications No. 2017-33546 filed Feb. 24, 2017 and No. 2017-091501 filed May 2, 2017 in the Japan Patent Office, the entire disclosures of which are incorporated herein by reference.

BACKGROUND

The present disclosure relates to a local area network (LAN) cable.

The LAN cable is used for LAN construction. The LAN cable includes a sheath that coats an outer periphery of an insulated electrical wire having an insulating layer formed on an outer periphery of a conductor, where a sheath using a non-halogen flame retardant resin composition is known for the sheath (see e.g., Japanese Unexamined Patent Publication No. 2015-4025).

In the LAN cable, the addition of the flame retardant to the insulating layer needs to be avoided to maintain a transmission property, and thus a flame retardant method using a non-halogen flame retardant resin composition in which the flame retardant is highly filled in the sheath has been adopted.

SUMMARY

However, with such a conventional flame retardant method, a high flame retardancy required in a flame retardancy test represented by an oversea standard cannot be achieved, and thus improvements are needed.

According to one aspect of the present disclosure, a LAN cable having high flame retardancy is preferably provided.

According to the present disclosure, the following LAN cable is provided.

[1] A LAN cable comprises an insulated electrical wire having an insulating layer on an outer periphery of a conductor, and a sheath that coats an outer periphery of the insulated electrical wire; where an intermediate layer is arranged between the sheath and the insulated electrical wire, the intermediate layer having a mass reduction rate at 800° C. of less than or equal to 80% by mass. The sheath comprises a cross-linked material, which is a non-halogen flame retardant resin composition, having a mass reduction rate at 800° C. of less than or equal to 60% by mass.

[2] The LAN cable according to [1], where the sheath contains greater than or equal to 150 parts by mass of flame retardant with respect to 100 parts by mass of polyolefin-based polymer.

[3] The LAN cable according to [1] or [2], where the intermediate layer comprises a polyimide film.

[4] The LAN cable according to [2], where the flame retardant comprises magnesium hydroxide or aluminum hydroxide.

According to the present disclosure, a LAN cable having high flame retardancy can be provided

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

One Embodiment of Present Disclosure

One embodiment of the present disclosure will be described below.

LAN Cable

A LAN cable comprises an insulated electrical wire having an insulating layer on an outer periphery of a conductor, and a sheath that coats an outer periphery of the insulated electrical wire; where an intermediate layer is arranged between the sheath and the insulated electrical wire, the intermediate layer having a mass reduction rate at 800° C. of less than or equal to 80% by mass, and the sheath comprises a cross-linked matter, which is a non-halogen flame retardant resin composition, having a mass reduction rate at 800° C. of less than or equal to 60% by mass.

However, with such a conventional flame retardant method in which a flame retardant is highly filled in the sheath, high flame retardancy required in a flame retardancy test represented by an oversea standard such as EN45545 and NFPA130 cannot be achieved.

Thus, the inventors of the present invention demonstrated that the burning of the insulating layer cannot be suppressed with such a conventional flame retardant method. The inventors then focused on a novel idea that flow-out of an inflammable gas generated from the insulating layer (at the time of burning) to a burning site needs to be suppressed.

Specifically, the inventors of the present invention invented that in order to suppress the flow-out of the inflammable gas generated from the insulating layer to the burning site, the intermediate layer needs to maintain the shape at the time of burning. Furthermore, a char layer needs to be formed on the sheath (without the sheath dripping at the time of burning) as the intermediate layer burns under presence of oxygen if the sheath drips at the time of the sheath burning.

Therefore, in the present disclosure, an intermediate layer having a mass reduction rate at 800° C. of less than or equal to 80% by mass is placed between the sheath and the insulated electrical wire. Also, the sheath comprises cross-linked matter, which is the non-halogen flame retardant resin composition, having the mass reduction rate at 800° C. of less than or equal to 60% by mass is adopted.

In the LAN cable of the present disclosure, the insulating body comprises flammable polyethylene. Even if the sheath is configured to be difficult to burn, the insulating body is easy to burn. Therefore, it is difficult to improve flame retardancy of the entire cable. This is considered because combustible gas generated from the insulating body at the time of burning the LAN cable breaks a sheath shell and leaks to a combustion field.

In the present disclosure, an intermediate layer is arranged between the insulating body and the sheath. Since the intermediate layer has a low mass reduction rate at high temperature, its shape can be maintained even at high temperature. The intermediate layer maintains the shape even at high temperature at the time of burning, and suppresses leaking of flammable gas originating from the insulating body to outside, thereby improving flame retardancy of the LAN cable. Also, the intermediate layer becomes easy to burn in the presence of oxygen, and shape holding performance is deteriorated. Therefore, by forming a sheath shell and steaming in the absence of oxygen in the intermediate layer, deterioration of shape holding performance of the intermediate layer is suppressed.

That is, arrangement of the intermediate layer that maintains its shape even at the time of burning on the insulating body enhances flame retardancy of the LAN cable.

The shape of the intermediate layer can be maintained by the sheath serving as a shell at the time of burning and the internal intermediate layer being steamed. It is preferable that the LAN cable of the present disclosure has an intermediate layer having a low mass reduction rate at high temperature arranged on the insulating body and the sheath covering the intermediate layer. It is further preferable that the LAN cable of the present disclosure has a film as an intermediate layer having a low mass reduction rate at high temperature on the insulating body and the sheath covering the film.

In addition, even when the content of a flame retardant is large, elongation at low temperature tends to decrease.

Therefore, by setting a flame retardant to 150 parts by mass or more and 220 parts by mass or less, preferably 180 to 200 parts by mass, with respect to 100 parts by mass of polyolefin-based polymer, elongation at low temperature of the sheath and the LAN cable is increased.

Intermediate Layer

The intermediate layer is arranged between the sheath and the insulated electrical wire. The intermediate layer has a mass reduction rate at 800° C. of less than or equal to 80% by mass, and more preferably less than or equal to 60% by mass. The mass reduction rate of the intermediate layer is a value obtained by measuring under a condition of temperature rising rate of 10° C./min. in a nitrogen atmosphere using a thermogravimetric analyzer (TGA), and measuring a rate of change in the mass at before and after the heating. With the arrangement of the intermediate layer having the property described above, the shape at the time of burning can be maintained, the flow-out of the inflammable gas generated from the insulating layer to the burning site can be suppressed, and high flame retardancy can be satisfied. To be specific, the mass reduction rate of the intermediate layer is obtained by a calculation formula below.

Mass reduction rate (%)=100×(Y–X)/Y

X: a mass value of the intermediate layer measured when the temperature is raised to a specified temperature under a condition of temperature rising rate of 10° C./min.

Y: a mass value of the intermediate layer before the temperature is raised

Examples of the material of the intermediate layer include metal, organic matter, and the like. Examples of the metal include copper, and the like. Furthermore, if the organic matter is used for the material of the intermediate layer, the flexibility of the LAN cable can be further enhanced. Examples of the organic matter include polyimide, an organic matter containing mica, and the like, and polyimide is preferable.

The position of the intermediate layer in the LAN cable can be appropriately selected, but is preferably a position immediately under the sheath, and more preferably on an inner surface side of the sheath and contacting the inner surface of the sheath. If the position is immediately under the sheath, the interior portion of the sheath is assumed to carbonize (char) at the time of burning as air is not interposed between the sheath and the intermediate layer when the sheath and the intermediate layer are closely attached to each other, and thus an effect of inhibiting the intermediate layer from burning under the oxygen atmosphere is assumed to be further enhanced.

Examples of the mode of the intermediate layer include a mode of being configured by winding a film. The intermediate layer may be configured by winding a plurality of films at a plurality of locations. The winding method of the film is not particularly limited, and examples thereof include lateral winding, longitudinal attachment, and the like. If the winding method of the film is lateral winding, the flexibility of the LAN cable can be further enhanced. In the case of the lateral winding, for example, the winding can be carried out while lapping (overlapping) a portion of a defined width in the film. The amount of lap is preferably greater than or equal to ¼ lap (greater than or equal to 25% of the area of the first layer of film).

Sheath

The sheath is a cross-linked material comprising a non-halogen flame retardant resin composition in which the mass reduction rate at 800° C. is: a) less than or equal to 60% by mass, b) more preferably greater than or equal to 52% by mass and less than or equal to 58% by mass, c) greater than or equal to 52% by mass and less than or equal to 56% by mass, and d) greater than or equal to 52% by mass and less than or equal to 54% by mass. The mass reduction rate of the sheath is a value obtained by measuring under a condition of temperature rising rate of 10° C./min. in a nitrogen atmosphere using the thermogravimetric analyzer (TGA), and measuring a rate of change in the mass at before and after the heating. With the arrangement of the sheath having the property described above, the sheath does not drip at the time of burning so that the intermediate layer can be in an oxygen deficient state, whereby the flame retardancy can be satisfied.

As long as the sheath is cross-linked, the cross linkage degree is not particularly limited, but suitably, that in which the gel fraction is greater than or equal to 80% by mass can be used. The measurement of gel fraction complies with the cross linkage degree measuring method of article 4.25 in JIS C 3005, and is a value obtained by immersing the sheath in xylene at 110° C. for 24 hours, and calculating from a weight ratio before and after the immersion.

Polyolefin-based polymer can be used for the sheath. The polyolefin-based polymer is preferably used as the base polymer of the sheath. Examples of the polyolefin-based polymer include low density polyethylene (LDPE), linear low density polyethylene (LLDPE), linear very-low density polyethylene (VLDPE), high density polyethylene (HDPE), polypropylene (PP), ethylene-ethyl acrylate copolymer (EEA), ethylene-vinyl acetate copolymer (EVA), ethylene-styrene copolymer, ethylene-glycidyl methacrylate copolymer, ethylene-butene-1 copolymer, ethylene-butene-hexene ternary copolymer, ethylene propylene-diene ternary copolymer (EPDM), ethylene-octene copolymer (EOR), ethylene copolymer polypropylene, ethylene-propylene copolymer (EPR), poly-4-methyl-pentene-1, maleic-acid graft low density polyethylene, hydrogenated styrene-butadiene copolymer (H-SBR), maleic-acid graft linear low density polyethylene, copolymer of ethylene and α olefin having a carbon number of 4 to 20, ethylene-styrene copolymer, maleic-acid graft ethylene-methyl acrylate copolymer, maleic-acid graft ethylene-vinyl acetate copolymer, ethylene-maleic anhydride copolymer, ethylene-ethyl acrylate-maleic anhydride ternary copolymer, ethylene-propylene-butene-1 ternary copolymer having butene-1 as a main component, and the like. The polyolefin-based polymer is preferably EVA, and is preferably EVA having a VA amount of greater than or equal to 20% by mass and less than or equal to 50% by mass. One of the types of EVA may be used alone, or two or more types of EVA may be blended and used for the polyolefin-based polymer.

If polyolefin-based polymer used for the sheath is, for example, an ethylene-vinyl acetate copolymer (EVA), the larger the amount of VA (vinyl acetate) is, the higher the glass transition temperature of EVA is, and various properties such as elongation at low temperature, tend to be deteriorated. Thus, EVA is preferably having a VA (vinyl acetate) amount of 20% to 50%.

It is preferable that acid-modified polyolefin is used as the polyolefin-based polymer used for the sheath. It is preferable that the acid-modified polyolefin is used with EVA. It is further preferable that glass transition temperature of the acid-modified polyolefin is −55° C. or less, more preferably in a range of −70° C. to −55° C. In this case, elongation of the sheath and the LAN cable at low temperature is further improved.

Examples of the acid-modified polyolefin used for the sheath may include maleic acid modified polyolefin, maleic acid grafted low density polyethylene, maleic acid grafted linear low density polyethylene, maleic acid grafted ethylene-methyl acrylate copolymer, maleic acid grafted ethylene-vinyl acetate copolymer, ethylene-maleic anhydride copolymer, and ethylene-ethyl acrylate-maleic anhydride terpolymer. In this case, the elongation property of the sheath and the LAN cable at low temperature is further improved.

The sheath that contains the flame retardant with respect to the polyolefin-based polymer can be used. Examples of the flame retardant include metallic hydroxide such as magnesium hydroxide, aluminum hydroxide, and calcium hydroxide; amorphous silica; zinc compound such as zinc stannate, hydroxy zinc stannate, zinc borate, and zinc oxide; boric acid compound such as calcium borate, barium borate, and barium metaborate; phosphorous flame retardant; nitrogen flame retardant such as melamine cyanurate; intumescent flame retardant including a mixture of a component that foams and a component that solidifies at the time of burning; and the like. The flame retardant is preferably a metallic hydroxide, and is particularly preferably a magnesium hydroxide. When the flame retardant contains magnesium hydroxide and/or aluminum hydroxide, the flame retardancy of the LAN cable is further enhanced.

One of the types of flame retardant described above may be used alone or two or more types may be blended and used. For example, magnesium hydroxide and aluminum hydroxide may be blended and used. The flame retardant may be surface-treated by silane coupling agent, titanate-based coupling agent, fatty acid such as stearic acid and calcium stearate, fatty acid metallic salt, and the like.

The content of the flame retardant is greater than or equal to 150 parts by mass with respect to 100 parts by mass of polyolefin-based polymer. The flame retardancy of the LAN cable is enhanced if the content is greater than or equal to 150 parts by mass with respect to 100 parts by mass of polyolefin-based polymer. An upper limit value in the content of the flame retardant is not particularly limited, but is preferably less than or equal to 250 parts by mass with respect to 100 parts by mass of polyolefin-based polymer. The stretch of the sheath under low temperature can be further increased by suppressing the content of the flame retardant. More preferably, the content of the flame retardant is greater than or equal to 150 parts by mass and less than or equal to 220 parts by mass; or greater than or equal to 180 parts by mass and less than or equal to 200 parts by mass with respect to 100 parts by mass of polyolefin-based polymer.

The sheath may further contain additives such as antioxidant, metal deactivator, cross linking agent, cross linking auxiliary agent, lubricant, inorganic filler, compatibilizing agent, stabilizing agent, carbon black, and coloring agent, as necessary. Furthermore, the sheath may be cross-linked by organic peroxide, or may be cross-linked by radiation such as an electron beam.

The antioxidant is not particularly limited, but examples thereof include phenol-based, sulfur-based, amine-based, phosphorus-based antioxidant, and the like. The phenol-based antioxidant is not particularly limited, but examples thereof include dibutylhydroxytoluene (BHT), pentaerythritol tetrakis[3-(3,5-di-t-butyl-4-hydroxypheynyl)propionate], 1,3,5-tris(3,5-di-t-butyl-4-hydroxy benzyl)-S-triazine-2,4,6-(1H,3H,5H) trion, tiodiethylenebis[3-(3,5-di-tert-butyl-4-hydroxyphenyl)propionate], and the like, and pentaerythritol tetrakis[3-(3,5-di-t-butyl-4-hydroxypheynyl) propionate] is more suitable.

The sulfur-based antioxidant is not particularly limited, but examples thereof include didodecyl 3,3'-thiodipropionate, ditridecyl 3,3'-thiodipropionate, dioctadecyl 3,3'-thiodipropionate, tetrakis[methylene-3-(dodecylthio)propionate]methane, and the like, and tetrakis[methylene-3-(dodecylthio)propionate]methane is more suitable. One of the types of such antioxidants described above may be used alone or two or more types may be blended and used.

The metal deactivator has an effect of stabilizing a metal ion by chelate formation, and suppressing oxidation degradation. The structure of the metal deactivator is not particularly limited, but examples thereof include N-(2H-1,2,4-triazol-5-yl) salicylamide, dodecanedioic acid bis[N2-(2-hydroxybenzoyl)hydrazide, 2',3-bis[[3-[3,5-di-tert-butyl-4-hydroxyphenyl]propionyl]]propionohydrazide, and the like, and 2',3-bis[[3-[3,5-di-tert-butyl-4-hydroxyphenyl]propionyl]]propionohydrazide is more suitable.

The cross-linking auxiliary agent is not particularly limited but examples thereof include trimethylol propane trimethacrylate (TMPT: manufactured by Shin-Nakamura Chemical Co., Ltd.), triallyl isocyanurate (TAIC), and the like. The lubricant is not particularly limited but examples thereof include fatty acid, fatty acid metallic salt, fatty acid amide, and the like, and zinc stearate (Nitto Chemical Industry Co., Ltd.) is specifically exemplified. One of the types of such lubricants described above may be used alone or two or more types may be blended and used.

The carbon black is not particularly limited, but examples thereof include rubber carbon black (N900-N100: ASTM D 1765-01), and the like. The coloring agent is not particularly limited, but examples thereof include a non-halogen color master batch, and the like.

Insulated Electrical Wire

The insulated electrical wire comprises an insulating layer on the outer periphery of a conductor. The conductor is not particularly limited in its material, and copper or copper alloy, or aluminum or aluminum alloy can be used. The configuration of the conductor is also not particularly limited, and in addition to a single wire, it is suitable to adopt a twisted wire structure in which a plurality of wires is twisted in view of the bendability of the cable. Furthermore, plating can be appropriately performed thereon, and for example, tinning, and the like can be coated.

The material of the insulating layer is not particularly limited, but is suitably polyethylene, and more suitably polyethylene having a dielectric constant of less than or equal to 2.5. If the dielectric constant of the polyethylene is less than or equal to 2.5, a capacitance of the insulating layer becomes small. The transmission property of the LAN cable is thus further enhanced. The dielectric constant of the entire insulating layer is preferably less than or equal to 2.5. In this case, the transmission property of the LAN cable is further enhanced. The dielectric constant of the entire insulating layer is more preferably: a) greater than or equal to 1.9 and less than or equal to 2.3; or b) greater than or equal to 1.9 and less than or equal to 2.1.

Examples of the polyethylene are, for example, low density polyethylene (LDPE), linear low density polyethylene (LLDPE), linear very-low density polyethylene (VLDPE), high density polyethylene (HDPE), and the like, and low density polyethylene is more suitable, and low density polyethylene having a density of less than or equal to 0.930 and an MFR of less than or equal to 0.30 g/10 minutes is particularly suitable. One of the types of polyethylene described above may be used alone or two or more types may be blended and used.

The insulating layer may further comprise an antioxidant, a copper inhibitor, a coloring agent, and the like. The content of the antioxidant, the copper inhibitor, the coloring agent, and the like is not particularly limited, but a content with which the dielectric constant of the entire insulating layer becomes less than or equal to 2.5 is preferred. The content of the coloring agent, and the like is preferably less than or equal to 5% by mass, and more preferably less than or equal to 2% by mass. Furthermore, the insulating layer may not contain the flame retardant. Through the use of the intermediate layer having the above property and the sheath having the above property, the LAN cable that satisfies high flame retardancy can be realized even if the insulating layer is a resin composition that does not contain the flame retardant.

The polyethylene may be foamed using a known method. For example, the polyethylene may be foamed through a method using an inert gas such as nitrogen, or using a chemical foaming agent such as Azodicarbonamide (ADCA). The extent of foaming of the polyethylene is preferably greater than or equal to 15% by mass.

LAN Cable

Figure 1:
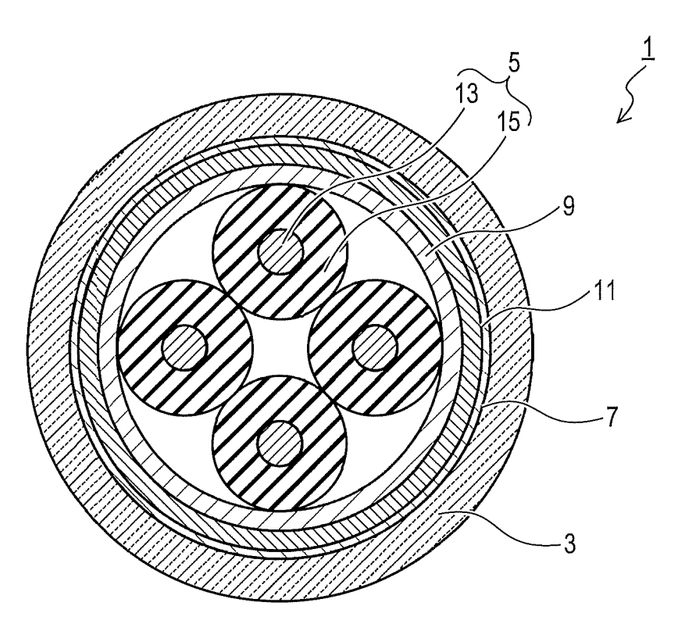
FIG. 1 is a cross-sectional view of a LAN cable according to one embodiment of the present disclosure.

FIG. 1 is a cross-sectional view of a LAN cable according to one embodiment of the present disclosure. A LAN cable 1 comprises a sheath 3, an insulated electrical wire 5, an intermediate layer 7, a resin tape 9, and a braided layer 11. The insulated electrical wire 5 comprises a conductor 13, and an insulating layer 15 located on the outer periphery of the conductor 13. In other words, the outer periphery of the conductor 13 is coated with the insulating layer 15. The intermediate layer 7 is located between the sheath 3 and the insulated electrical wire 5. The resin tape 9 and the braided layer 11 are located between the insulated electrical wire 5 and the intermediate layer 7. The resin tape 9 is not limited in its material, and aluminum laminate PET tape can be used. Furthermore, the insulated electrical wire similar to the insulated electrical wire described above can be used for the insulated electrical wire. The braided layer 11 is not particularly limited in its material, and copper or copper alloy can be used.

EXAMPLES

Next, the present disclosure will be described in further detail based on the examples, but the present disclosure is not limited to such examples.

First Example (1) Manufacturing of LAN Cable 1

The manufacturing method of the LAN cable 1 is as described below. First, according to the compounding ingredients shown in Table 1, the materials of the insulating layer and the sheath were respectively prepared.

In such compounding ingredients, a pellet obtained by kneading at a starting temperature of 40° C. and a finishing temperature of 190° C. with a pressurizing kneader was used for the material of the insulating body and the sheath. Next, a conductor having an outer diameter of 0.78 mm was coated with the material of the insulating layer described above to a thickness of 0.4 mm, and then cross-linked with an exposure dose of 7 MRad to manufacture the electrical wire.

Next, four insulated electrical wires were twisted, and the aluminum laminate PET tape was wound by ¼ lap thereon. The copper braid was then placed thereover. The polyimide tape was then laterally wound by ¼ lap to form the intermediate layer. The material of the sheath described above was then coated to a thickness of 1.1 mm, and irradiated and cross-linked with an exposure dose of 13 MRad to manufacture the LAN cable.

Second Example

In a second example, a LAN cable was manufactured similarly to the first example other than that the extent of foaming of the insulating body was 15% by mass and the dielectric constant of the insulating body was 2.1.

Third Example

In a third example, a LAN cable was manufactured similarly to the first example other than that the extent of foaming of the insulating body was 15% by mass, the dielectric constant of the insulating body was 1.9, and the exposure dose of the sheath was 10 Mrad.

Fourth Example

In a fourth example, a LAN cable was manufactured similarly to the first example other than that two polyimide films were used.

Fifth Example

In a fifth example, a LAN cable was manufactured similarly to the first example other than that the extent of foaming of the insulating body was 15% by mass, the dielectric constant of the insulating body was 2.1, the compounding ratios of the magnesium hydroxide (I) and the magnesium hydroxide (II) were 60 parts by mass and 90 parts by mass, respectively, and the mass reduction rate of the sheath was 58% by mass.

Sixth Example

In a sixth example, a LAN cable was manufactured similarly to the first example other than that the extent of foaming of the insulating body was 15% by mass, the dielectric constant of the insulating body was 2.1, the compounding ratios of the magnesium hydroxide (I) and the magnesium hydroxide (II) were 80 parts by mass and 120 parts by mass, respectively, and the mass reduction rate of the sheath was 54% by mass.

Seventh Example

In a seventh example, a LAN cable was manufactured similarly to the first example other than that the extent of foaming of the insulating body was 15% by mass, the dielectric constant of the insulating body was 2.1, the compounding ratios of the magnesium hydroxide (I) and the magnesium hydroxide (II) were 90 parts by mass and 130 parts by mass, respectively, and the reduction rate of the sheath was 52% by mass.

Eighth Example

In an eighth example, a LAN cable was manufactured similarly to the first example other than that instead of the EVA in which the VA amount was 28% by mass and the MFR was 6.0, the EVA in which the VA amount was 17% by mass and the MFR was 0.8 was used by 60 parts by mass.

Ninth Example

In a ninth example, a LAN cable was manufactured similarly to the first example other than that instead of using 10 parts by mass of the EVA in which the VA amount was 28% by mass and the MFR was 6.0, 60 parts by mass of the EVA in which the VA amount was 33% by mass and the MFR was 1.0 was used.

Tenth Example

In a tenth example, a LAN cable was manufactured similarly to the first example other than that instead of the EVA in which the VA amount was 33% by mass and the MFR was 1.0, 10 parts by mass of LDPE was used.

First Comparative Example

In a first comparative example, a LAN cable was manufactured similarly to the first example, other than that the polyimide film was not used.

Second Comparative Example

In a second comparative example, a LAN cable was manufactured similarly to the first example, other than that the PET film was used instead of the polyimide film.

Third Comparative Example

In a third comparative example, a LAN cable was manufactured similarly to the first example, other than that the sheath was not cross-linked.

Fourth Comparative Example

In a fourth comparative example, a LAN cable was manufactured similarly to the first example other than that the compounding ratios of the magnesium hydroxide (I) and the magnesium hydroxide (II) were 40 parts by mass and 80 parts by mass, respectively, and the mass reduction rate of the sheath was 62% by mass.

TABLE 1

| | Material | Composition | | First Example | Second Example | Third Example | Fourth Example | Fifth Example |
|---|---|---|---|---|---|---|---|---|
| Compounding ingredient of insulating body | Polymer | LDPE | Density 0.924, MFR 0.23 | 100 | 100 | 100 | 100 | 100 |
| | Antioxidant | ADK STAB AO-18 (manufactured by ADEKA Co.) | | 0.5 | 0.5 | 0.5 | 0.5 | 0.5 |
| | | Extent of foaming (%) of insulating body | | 0 | 15 | 15 | 0 | 15 |
| | | Dielectric constant of insulating body | | 2.3 | 2.1 | 1.9 | 2.3 | 2.1 |
| Intermediate layer | | Polyimide film (Thickness 0.025 mm, width 15 mm, 1/4 lap) | | One | One | One | Two | One |
| Compounding ingredient of sheath | Polymer | EVA | VA amount 28%, MFR 6.0 | 60 | 60 | 60 | 60 | 60 |
| | | EVA | VA amount 33%, MFR 1.0 | 10 | 10 | 10 | 10 | 10 |
| | | EVA | VA amount 46%, MFR 100 | 10 | 10 | 10 | 10 | 10 |
| | | Maleic-acid modified polyolefin A (Tg: −65) | | 20 | 20 | 20 | 20 | 20 |
| | Flame retardant | Magnesium hydroxide (I) | | 70 | 70 | 70 | 70 | 60 |
| | | Magnesium hydroxide (II) | | 110 | 110 | 110 | 110 | 90 |
| | Cross-linking auxiliary agent | TMPT (manufactured by Shin-Nakamura Chemical Co., Ltd.) | | 4 | 4 | 4 | 4 | 4 |
| | Lubricant | Zinc stearate (manufactured by Nitto Kasei Co., Ltd.) | | 1 | 1 | 1 | 1 | 1 |
| | Antioxidant | ADK STAB AO-18 (manufactured by ADEKA Co.) | | 1 | 1 | 1 | 1 | 1 |
| | Coloring agent | FT carbon | | 2 | 2 | 2 | 2 | 2 |
| Sheath property | Tensile test | | Tensile strength (MPa) | ○ 12.6 | ○ 12.6 | ○ 14.3 | ○ 12.7 | ○ 11 |
| | | | Stretch (%) | ○ 150 | ○ 150 | ○ 140 | ○ 150 | ○ 230 |
| | Low temperature performance test | | | ○ | ○ | ○ | ○ | ○ |
| | Sheath exposure dose (Mrad) | | | 6 | 6 | 10 | 6 | 6 |
| | Weight reduction rate (%) of sheath | | | 56 | 56 | 56 | 56 | 58 |
| LAN cable property | Low temperature performance test | | | ○ | ○ | ○ | ○ | ○ |
| | Flame retardancy test | | | ○ | ◎ | ◎ | ◎ | ○ |
| | Transmission property | Capacitance | | ○ | ○ | ○ | ○ | ○ |
| | Determination | | | ○ | ○ | ○ | ○ | ○ |

TABLE 2

| | Material | Composition | Sixth Example | Seventh Example | Eighth Example | Ninth Example | Tenth Example |
|---|---|---|---|---|---|---|---|
| Compounding ingredient of insulating body | Polymer | LDPE Density 0.924, MFR 0.23 | 100 | 100 | 100 | 100 | 100 |
| | Antioxidant | ADK STAB AO-18 (manufactured by ADEKA Co.) | 0.5 | 0.5 | 0.5 | 0.5 | 0.5 |
| | | Extent of foaming (%) of insulating body | 15 | 15 | 0 | 0 | 0 |
| | | Dielectric constant of insulating body | 2.1 | 2.1 | 2.3 | 2.3 | 2.3 |
| Intermediate layer | | Polyimide film (Thickness 0.025 mm, width 15 mm, 1/4 lap) | One | One | One | One | One |
| Compounding ingredient of sheath | Polymer | EVA VA amount 17%, MFR 0.8 | | | 60 | | |
| Sheath property | | EVA VA amount 28%, MFR 6.0 | 60 | 60 | | 10 | 60 |
| | | EVA VA amount 33%, MFR 1.0 | 10 | 10 | 10 | 60 | |
| | | EVA VA amount 46%, MFR 100 | 10 | 10 | 10 | 10 | 10 |
| | | LDPE Density 0.924, MFR 0.23 | | | | | 10 |
| | | Maleic-acid modified polyolefin A (Tg: −65) | 20 | 20 | 20 | 20 | 20 |
| | Flame retardant | Magnesium hydroxide (I) | 80 | 90 | 70 | 70 | 70 |
| | | Magnesium hydroxide (II) | 120 | 130 | 110 | 110 | 110 |
| | Cross-linking auxiliary agent | TMPT (manufactured by Shin-Nakamura Chemical Co., Ltd.) | 4 | 4 | 4 | 4 | 4 |
| | Lubricant | Zinc stearate (manufactured by Nitto Kasei Co., Ltd.) | 1 | 1 | 1 | 1 | 1 |
| | Antioxidant | ADK STAB AO-18 (manufactured by ADEKA Co.) | 1 | 1 | 1 | 1 | 1 |
| | Coloring agent | FT carbon | 2 | 2 | 2 | 2 | 2 |
| Sheath property | Tensile test | Tensile strength (MPa) | ○ 13.2 | ○ 13.6 | ○ 14.2 | ○ 13 | ○ 12.1 |
| | | Stretch (%) | ○ 140 | ○ 130 | ○ 140 | ○ 150 | ○ 170 |
| | Low temperature performance test | | ○ | ○ | ○ | ○ | ○ |
| | Sheath exposure dose (Mrad) | | 6 | 6 | 6 | 6 | 6 |
| | Weight reduction rate (%) of sheath | | 54 | 52 | 56 | 56 | 56 |
| LAN cable property | Low temperature performance test | | ○ | ○ | ○ | ○ | ○ |
| | Flame retardancy test | | ◎ | ◎ | ○ | ○ | ○ |
| | Transmission property | Capacitance | ○ | ○ | ○ | ○ | ○ |
| | | Determination | ○ | ○ | ○ | ○ | ○ |

TABLE 3

| | Material | Composition | First Comparative Example | Second Comparative Example | Third Comparative Example | Fourth Comparative Example |
|---|---|---|---|---|---|---|
| Compounding ingredient of insulating body | Polymer | LDPE Density 0.924, MFR 0.23 | 100 | 100 | 100 | 100 |
| | Antioxidant | ADK STAB AO-18 (manufactured by ADEKA Co.) | 0.5 | 0.5 | 0.5 | 0.5 |
| | | Extent of foaming (%) of insulating body | 0 | 0 | 0 | 0 |
| | | Dielectric constant of insulating body | 2.3 | 2.3 | 2.3 | 2.3 |
| Intermediate layer | | Polyimide film (Thickness 0.025 mm, width 15 mm, 1/4 lap) | None | None | One | One |
| | | PET film (Thickness 0.025 mm, width 15 mm, 1/4 lap) | | One | | |
| Compounding ingredient of sheath | Polymer | EVA VA amount 28%, MFR 6.0 | 60 | 60 | 60 | 60 |
| | | EVA VA amount 33%, MFR 1.0 | 10 | 10 | 10 | 10 |
| | | EVA VA amount 46%, MFR 100 | 10 | 10 | 10 | 10 |
| | | Maleic-acid modified polyolefin A (Tg: −65) | 20 | 20 | 20 | 20 |
| | Flame retardant | Magnesium hydroxide (I) | 70 | 70 | 70 | 40 |
| | | Magnesium hydroxide (II) | 110 | 110 | 110 | 80 |
| | Cross-linking auxiliary agent | TMPT (manufactured by Shin-Nakamura Chemical Co., Ltd.) | 4 | 4 | 4 | 4 |
| | Lubricant | Zinc stearate (manufactured by Nitto Kasei Co., Ltd.) | 1 | 1 | 1 | 1 |
| | Antioxidant | ADK STAB AO-18 (manufactured by ADEKA Co.) | 1 | 1 | 1 | 1 |
| | Coloring agent | FT carbon | 2 | 2 | 2 | 2 |
| | Sheath exposure dose (Mrad) | | 6 | 6 | 0 | 6 |
| | Weight reduction rate (%) of sheath | | 56 | 56 | 56 | 62 |
| Sheath property | Tensile test | Tensile strength (MPa) | ○ 12.6 | ○ 12.2 | X 8.5 | ○ 13 |
| | | Stretch (%) | ○ 150 | ○ 160 | ○ 210 | ○ 230 |
| | Low temperature performance test | | ○ | ○ | ○ | ○ |

TABLE 3-continued

| Material | | Composition | First Comparative Example | Second Comparative Example | Third Comparative Example | Fourth Comparative Example |
|---|---|---|---|---|---|---|
| LAN cable property | Low temperature performance test | | ○ | ○ | ○ | ○ |
| | Flame retardancy test | | X | X | X | X |
| | Transmission property | Capacitance | ○ | ○ | ○ | ○ |
| | Determination | | X | X | X | X |

The polyimide film in Table 1 to Table 3 is Kapton 200H (manufactured by Du Pont-Toray Co., Ltd.). The maleic-acid modified polyolefin A in Table 1 to Table 3 is TAFMER M117020 (manufactured by Mitsui Chemicals, Inc.). The magnesium hydroxide (I) in Table 1 to Table 3 is MAGNIFIN H10A (manufactured by Albemarle Co.). The magnesium hydroxide (II) in Table 1 to Table 3 is MAGNIFIN H10C (manufactured by Albemarle Co.). The mass reduction rate at 600° C. of the polyimide film shown in Table 1 to Table 3 is 24% by mass, and the mass reduction rate at 800° C. is 65% by mass. Furthermore, the mass reduction rate at 600° C. of the PET film shown in Table 3 is 100% by mass, and the mass reduction rate at 800° C. is 100% by mass.

(1) Test of Sheath Property

The following tests were conducted for the examples and the comparative examples. The test results are shown in Table 1 to Table 3.

(1-1) Tensile Test of Sheath (Tensile Strength in MPa, and Stretch in %)

Only the sheath was stripped off from the LAN cable, and was punched out to a size 6 dumbbell test piece. Next, using the test piece, the tensile test was conducted under a condition in which the tensile speed was 200 mm/min. in compliant with JIS C 3005. With regards to the stretch, × (failed) was marked if the stretch was less than 125%, and ○ (passed) was marked if the stretch was greater than or equal to 125%.

With regard to the tensile strength, × (failed) was marked if the tensile strength was less than 10 MPa, and ○ (passed) was marked if the tensile strength was greater than or equal to 10 MPa.

(1-2) Low Temperature Performance Test of Sheath

The test piece was obtained similarly to the case of the tensile test. Using the test piece, the tensile test was conducted under a condition in which the tensile speed was 25 mm/min. at −55° C. in compliant with EN60811-1-4. ○ (passed) was marked if the stretch property was greater than or equal to 30%, and × (failed) was marked if the stretch property was less than 30%.

(2) Test of LAN Cable Property

The following tests were conducted for the examples and the comparative examples. The test results are shown in Table 1 to Table 3.

(2-1) Low Temperature Performance Test of LAN Cable

The bending test was conducted at −55° C. for the LAN cable in compliant with EN60811-1-4 8.1. ○ (passed) was marked if no crack was formed after the winding, and × (failed) was marked if a crack was formed after the winding.

(2-2) Flame Retardancy Test of LAN Cable

The VTFT test was conducted in compliant with the IEEE standard 1202. ○ (passed) was marked if the damage distance of the LAN cable was less than or equal to 1.5 m and greater than 1.0 m, and ⊚ (passed with good tolerance) was marked if the damage distance was less than or equal to 1.0 m, and × (failed) was marked if the damage distance was greater than 1.5 m.

(2-3) Transmission Property Test of LAN Cable

The capacitance was measured in compliant with JIS X 5150 and TIA-568-C,2. ○ (passed) was marked if the capacitance was less than or equal to 5.6 nF/100 m, and × (failed) was marked if the capacitance was greater than 5.6 nF/100 m.

(Evaluation Results)

The evaluation results of the first example to the tenth example were satisfactory for all the test items, as shown in Table 1 and Table 2. In particular, in the fourth example, the flame retardancy was higher because the number of polyimide film was two.

In the first comparative example, the test result of the flame retardancy was ×. The reason for this is assumed to be because the intermediate layer 7 was not arranged.

In the second comparative example, the test result of the flame retardancy was ×. The reason for this is assumed to be because the mass reduction rate of the PET film used to form the intermediate layer 7 is greater than a defined range of the present disclosure.

In the third comparative example, the test result of the flame retardancy was ×. The reason for this is assumed to be because the sheath is not cross-linked.

In the fourth comparative example, the test result of the flame retardancy was ×. The reason for this is assumed to be because the mass reduction rate of the sheath is 62% by mass and is greater than a defined range of the present disclosure.

The embodiment of the present disclosure has been described, but the present disclosure is not limited to the embodiment described above, and various modifications can be made.

(1) The mode of the LAN cable may be, for example, a duplex insulating body structure or other structures.

(2) The function of one constituent in each embodiment described above may be divided among a plurality of constituents, and the functions of the plurality of constituents may be fulfilled by one constituent. Furthermore, one part of the configuration of each embodiment described above may be omitted. Moreover, at least one part of the configuration of each embodiment described above may be added, replaced, and the like with respect to the other configurations of the embodiment described above. Various modes included in the technical idea specified by the Claims are to be considered as the embodiment of the present disclosure.

(3) In addition to the LAN cable described above, the present disclosure can also be realized in various modes such as the manufacturing method of the LAN cable.

What is claimed is:

1. A LAN cable comprising:
an insulated electrical wire comprising an insulating layer on an outer periphery of a conductor;

a resin tape comprising an aluminum laminate PET tape surrounding the insulated electrical wire;

a braided layer comprising copper surrounding the resin tape;

an intermediate layer surrounding the braided layer, the intermediate layer comprising a polyimide and having a mass reduction rate at 800° C. of less than or equal to 80% by mass; and a sheath surrounding the intermediate layer, the sheath comprising a cross-linked non-halogen flame retardant resin composition in which the mass reduction rate at 800° C. is less than or equal to 60% by mass.

2. The LAN cable according to claim 1, wherein the sheath comprises greater than or equal to 150 parts by mass of a flame retardant with respect to 100 parts by mass of a polyolefin-based polymer.

3. The LAN cable according to claim 2, wherein the intermediate layer comprises a polyimide film.

4. The LAN cable according to claim 2, wherein the flame retardant comprises magnesium hydroxide or aluminum hydroxide.

5. The LAN cable according to claim 1, wherein the intermediate layer comprises a polyimide film.

\* \* \* \* \*